United States Patent
Foster et al.

(10) Patent No.: US 8,303,245 B2
(45) Date of Patent: Nov. 6, 2012

(54) SHROUD ASSEMBLY WITH DISCOURAGER

(75) Inventors: Gregory Thomas Foster, Greenville, SC (US); Andres Jose Garcia Crespo, Greenville, SC (US); Herbert Chidsey Roberts, Greenville, SC (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 12/576,386

(22) Filed: Oct. 9, 2009

(65) Prior Publication Data

US 2011/0085899 A1    Apr. 14, 2011

(51) Int. Cl.
*F01D 11/08* (2006.01)
(52) U.S. Cl. ..................... 415/134; 415/173.1
(58) Field of Classification Search .................. 415/134, 415/139, 173.1; 416/193 A
See application file for complete search history.

(56) References Cited

U.S. PATENT DOCUMENTS

| | | | | |
|---|---|---|---|---|
| 4,650,395 | A * | 3/1987 | Weidner | 415/173.1 |
| 6,113,349 | A * | 9/2000 | Bagepalli et al. | 415/135 |
| 6,962,482 | B2 * | 11/2005 | Tanaka | 415/173.1 |
| 2002/0094268 | A1 * | 7/2002 | Sugishita et al. | 415/139 |
| 2007/0031258 | A1 | 2/2007 | Campbell et al. | |
| 2007/0258816 | A1 * | 11/2007 | Bouchard et al. | 416/193 A |
| 2008/0206046 | A1 | 8/2008 | Razzell et al. | |
| 2009/0010755 | A1 | 1/2009 | Keller et al. | |

FOREIGN PATENT DOCUMENTS

| | | | |
|---|---|---|---|
| JP | 10103011 A | * | 4/1998 |
| JP | 10103012 A | * | 4/1998 |
| JP | 10103014 A | * | 4/1998 |

OTHER PUBLICATIONS

JP10103011A Machine Translation. Accessed JPO website on Dec. 15, 2011.*
JP 10-103014 A Machine Translation. Accessed JPO website Jun. 8, 2012. 4 Pages.*

* cited by examiner

*Primary Examiner* — Richard Edgar
(74) *Attorney, Agent, or Firm* — Ernest G. Cusick; Hoffman Warnick LLC

(57) ABSTRACT

A turbine shroud assembly is disclosed, the shroud assembly including an outer shroud, at least one inner shroud attached to the outer shroud, and at least one discourager enclosed within the inner shroud. The discourager prevents the hot gas or steam in the turbine from having a direct line of access to the outer shroud. In one embodiment, one inner shroud is provided for the shroud assembly, with one discourager enclosed within the inner shroud, the discourager positioned offset from the inner shroud so as to extend past the inner shroud and into an inner shroud of a neighboring shroud assembly. In another embodiment, a plurality of inner shrouds are provided, each inner shroud enclosing a discourager, the discouragers being adjacent to each other within the inner shrouds and positioned offset from the inner shrouds so as to cover a gap between the inner shrouds.

18 Claims, 7 Drawing Sheets

SHROUD ASSEMBLY WITH DISCOURAGER

BACKGROUND OF THE INVENTION

The present invention relates generally to turbine shroud assemblies and more particularly to a discourager for use in a turbine shroud assembly.

Shrouds are used in turbines and engines to act as an interface between rotating blades and a casing structure. The shroud provides tight tip clearance to the blades, and provides a mounting for the nozzles. Typically, such shrouds are made of a metal material. However, industrial gas turbine and aircraft engine shrouds operate in a high temperature environment and therefore require cooling to obtain a useful design life cycle. An alternative to using a metal shroud with cooling air is to use a ceramic matrix composite (CMC) material for the shroud, thus eliminating the required cooling of the shroud due to the CMC's superior temperature capability over metal. The CMC shroud typically includes seals to prevent the high heat at the end of the shroud nearest the gas/steam path from reaching the end nearest the metal outer casing. Typically, the seal must be cooled in order to effectively seal the shroud end gaps to maintain design life of the seal.

BRIEF DESCRIPTION OF THE INVENTION

A turbine shroud assembly is disclosed, the shroud assembly including an outer shroud, at least one hollow tubular inner shroud attached to the outer shroud, and at least one discourager enclosed within the inner shroud. The discourager prevents the hot gas or steam in the turbine from having a direct line of access to the outer shroud. In one embodiment, one inner shroud is provided for the shroud assembly, with one discourager enclosed within the inner shroud, the discourager positioned offset from the inner shroud so as to extend past the inner shroud and into an inner shroud of a neighboring shroud assembly. In another embodiment, a plurality of inner shrouds are provided, each inner shroud enclosing a discourager, the discouragers adjacent to each other within the inner shrouds and positioned offset from the inner shrouds so as to cover a gap between the inner shrouds.

A first aspect of the invention provides a shroud assembly for use in a turbine, the shroud assembly comprising: an outer shroud having a first side configured to interface with an outer casing of the turbine, and a second side proximate to a flow of an operative fluid of the turbine; an inner shroud positioned between the second side of the outer shroud and the operative fluid flow of the turbine; and a discourager enclosed within the inner shroud, the discourager positioned offset from the inner shroud so as to extend past the inner shroud and into an inner shroud of a neighboring shroud assembly.

A second aspect of the invention provides a shroud assembly for use in a turbine, the shroud assembly comprising: an outer shroud having a first side configured to interface with an outer casing of the turbine, and a second side proximate to a flow of an operative fluid of the turbine; at least two inner shrouds adjacent to each other, positioned to create an expansion space therebetween, the at least two inner shrouds positioned between the second side of the outer shroud and the operative fluid flow of the turbine; and at least two discouragers adjacent to each other enclosed within the inner shrouds, the discouragers positioned offset from the inner shrouds so as to cover the expansion space.

A third aspect of the invention provides a turbine comprising: an outer casing; at least one rotating blade; and a shroud assembly positioned between the outer casing of the turbine and the at least one rotating blade, the shroud assembly comprising: an outer shroud having a first side configured to interface with the outer casing, and a second side configured to interface with the at least one rotating blade proximate to a flow of an operative fluid of the turbine; at least one inner shroud positioned between the second side of the outer shroud and the operative fluid flow of the turbine; and at least one discourager enclosed within the inner shroud, the discourager positioned offset from the inner shroud.

BRIEF DESCRIPTION OF THE DRAWINGS

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
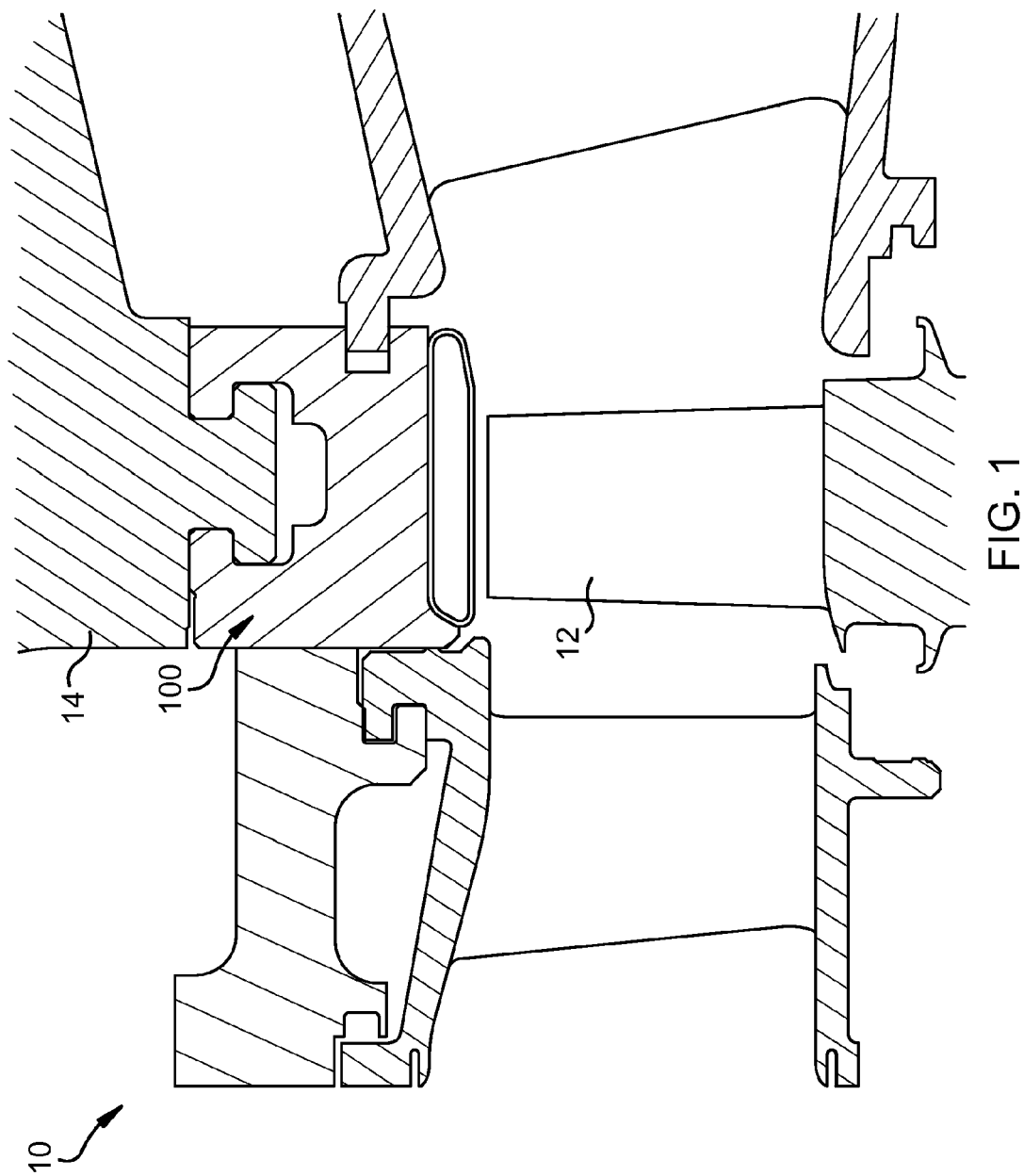
FIG. 1 is a cross-sectional view of a shroud assembly within a turbine according to an embodiment of this invention.

Turning to the figures, FIG. 1 shows a turbine shroud assembly 100 within a turbine 10 (partially shown in FIG. 1) according to an embodiment of this invention. Turbine 10 includes at least one rotating blade 12 and an outer casing 14. According to embodiments of this invention, at least one shroud assembly 100 is positioned between rotating blade 12 and outer casing 14. As also known in the art, an operative fluid (e.g., combustion gas or steam) flows through the turbine, impinging on rotating blades 12. It should be noted that, as will be appreciated by one of ordinary skill in the art, turbine 10 can be any type of turbine, such as a steam turbine, gas turbine, combined gas and steam turbine, LP turbine, IP turbine, single flow steam turbine, combined-cycle turbine, opposed-flow turbine, and/or HP turbines.

Figure 2:
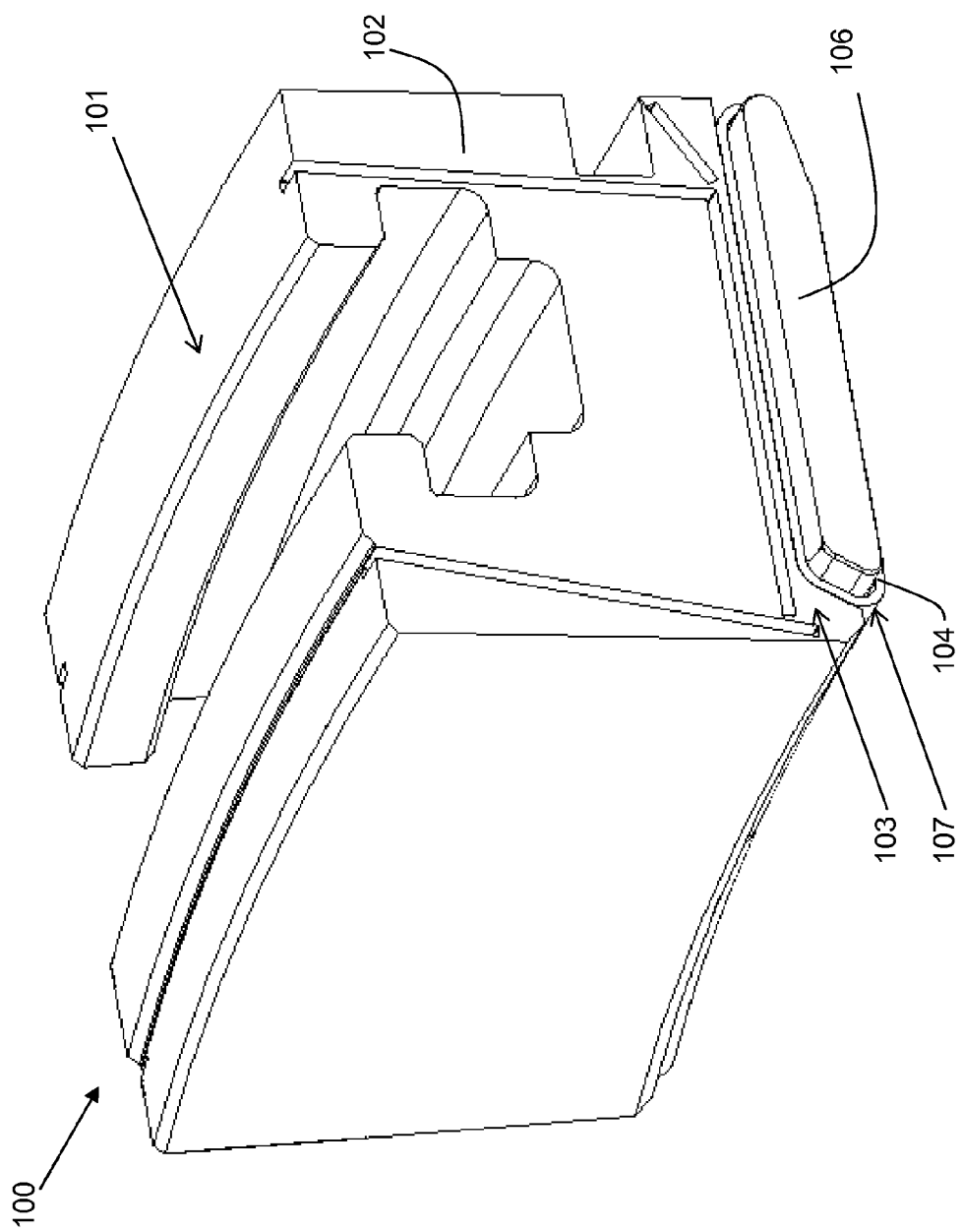
FIG. 2 is an isometric view of a turbine shroud assembly according to an embodiment of this invention.

A shroud assembly 100 according to embodiments of this invention is shown in FIG. 2. Turbine shroud assembly 100 includes an outer shroud 102, having a first side 101 configured to interface with outer casing 14 of turbine 10. Outer shroud 102 further includes a second side 103 which is proximate to rotating blade 12, and therefore to the operative fluid path of the turbine. As explained herein, using embodiments of this invention, outer shroud 102 need not be comprised of a high-heat resistant material, and any desired material can be used, such as metal.

Figure 3:
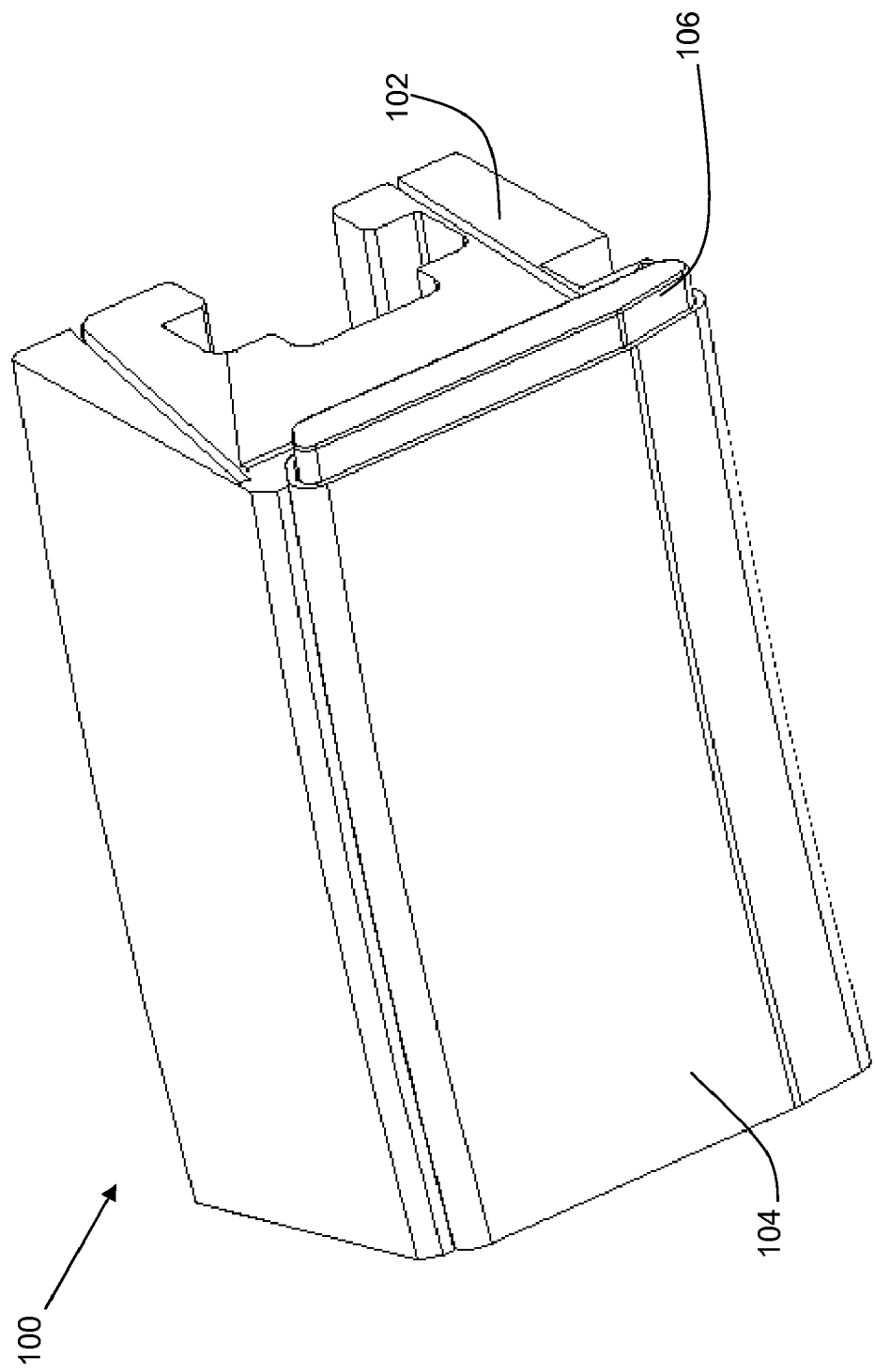
FIGS. 3 and 4 are isometric views of a turbine shroud assembly according to embodiments of this invention.
Figure 4:
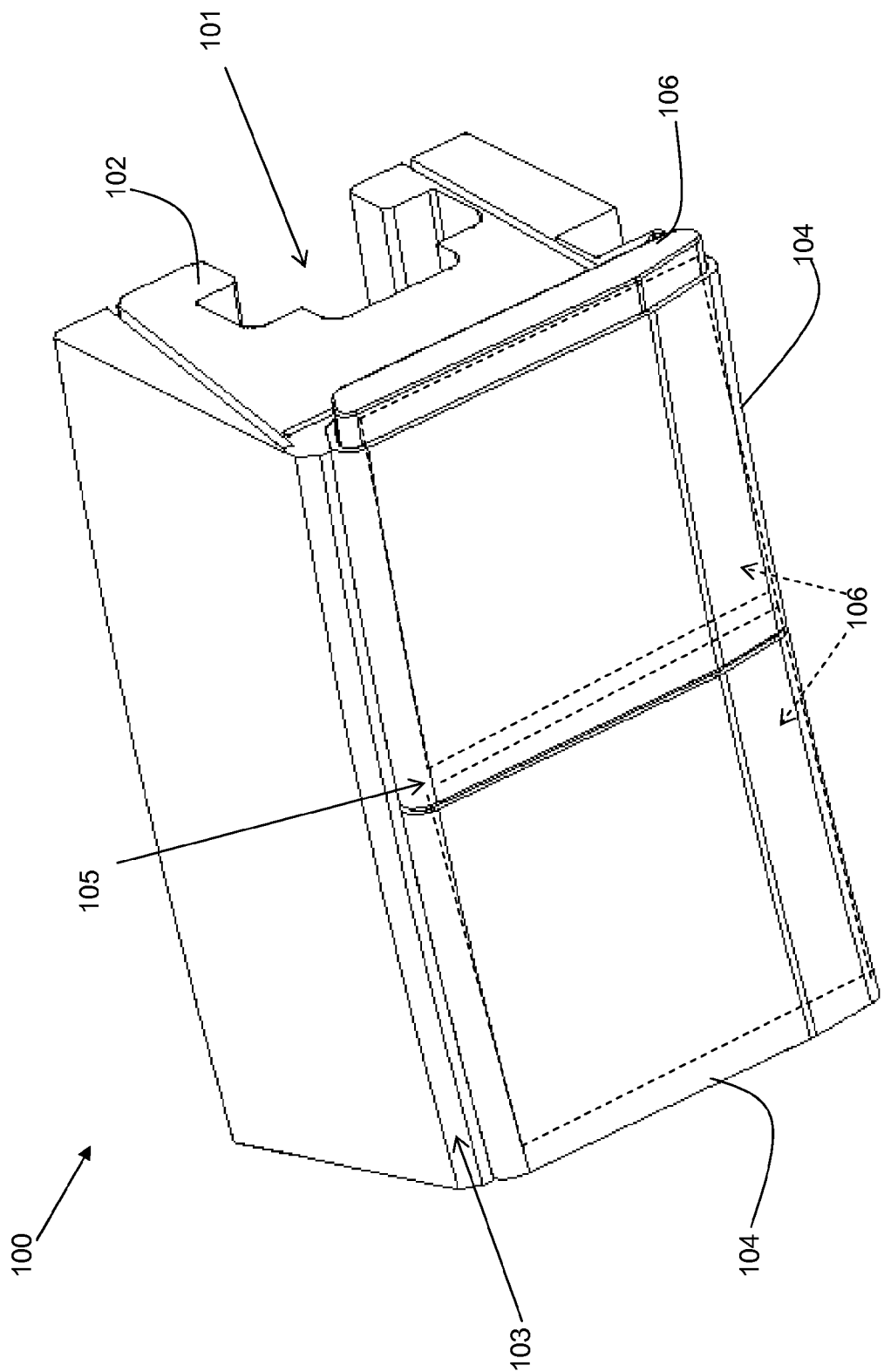

As also shown in FIG. 2, and in more detail in FIG. 3, turbine shroud assembly 100 further includes at least one inner shroud 104 which is attached to second side 103 of outer shroud 102, between outer shroud 102 and the operative fluid path of turbine 10. Due to the proximity to the operative fluid path, inner shrouds 104 are subject to high temperatures. Thus, in another embodiment, shown in FIG. 4, a plurality of inner shrouds 104 can be provided (for example, two inner shrouds 104, as shown in FIG. 4), that are adjacent to each other, with an expansion space 105 between them in order to allow for expansion due to the high heat emitted from the combustion gas or steam path of turbine 10. Inner shrouds 104 can be of a hollow, tubular shape, or any other suitable shape or consistency. In addition, inner shrouds can be comprised of a ceramic matrix composite material (CMC), or any other suitable material capable of withstanding high temperatures such as a ceramic material, a monolithic type ceramic, or a turbine grade superalloy (such as a Ni superalloy).

Regardless of how many inner shrouds 104 are provided, each inner shroud 104 encloses at least one discourager 106. For example, in the embodiment shown in FIG. 4, two inner shrouds 104 enclose two discouragers 106, and discouragers 106 are positioned adjacent to each other within inner shrouds 104. In FIG. 3, one inner shroud 104 encloses one discourager 106.

Figure 7:
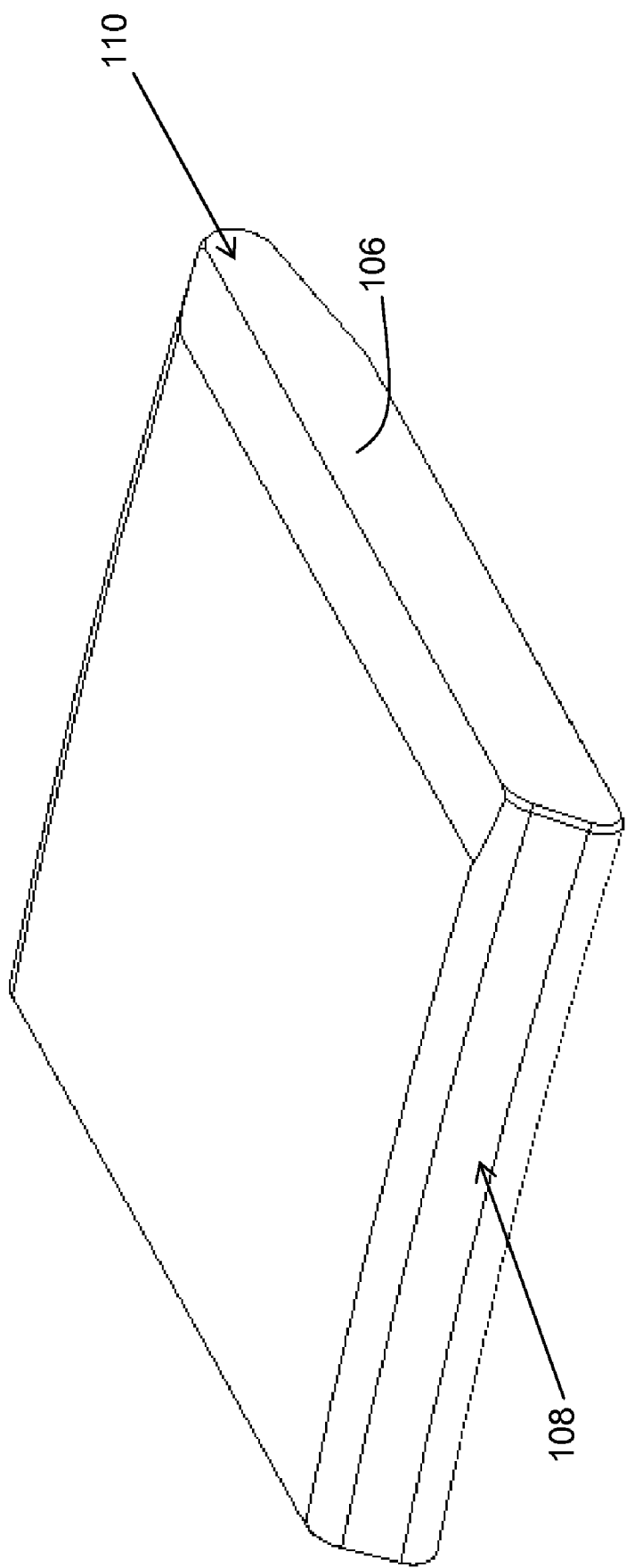
FIG. 7 is an isometric view of a discourager for use in a turbine shroud assembly according to an embodiment of this invention.

Discouragers 106 can comprise a hollow or solid tubular shape, or any other desired shape configured to fit within inner shrouds 104. In order to best discourage heat from reaching outer shroud 102, discouragers 106, or at least a portion of discouragers 106 that are closest to second side 103 of outer shroud 102, are preferably substantially impermeable and non-porous, i.e., without holes that could allow hot operative fluid to pass through discouragers 106. In one embodiment, shown most clearly in FIG. 7, discouragers 106 can comprise a substantially solid shape corresponding to the hollow channel within inner shrouds 104. In other words, discouragers 106 have a shape and size that substantially corresponds to the shape and size of the hollow channel of inner shrouds 104 (e.g., the circumferential and/or axial shape and size of the hollow channel) such that discouragers 106 can substantially fill the hollow channel of inner shrouds 104, as shown in FIGS. 2-5.

Figure 5:
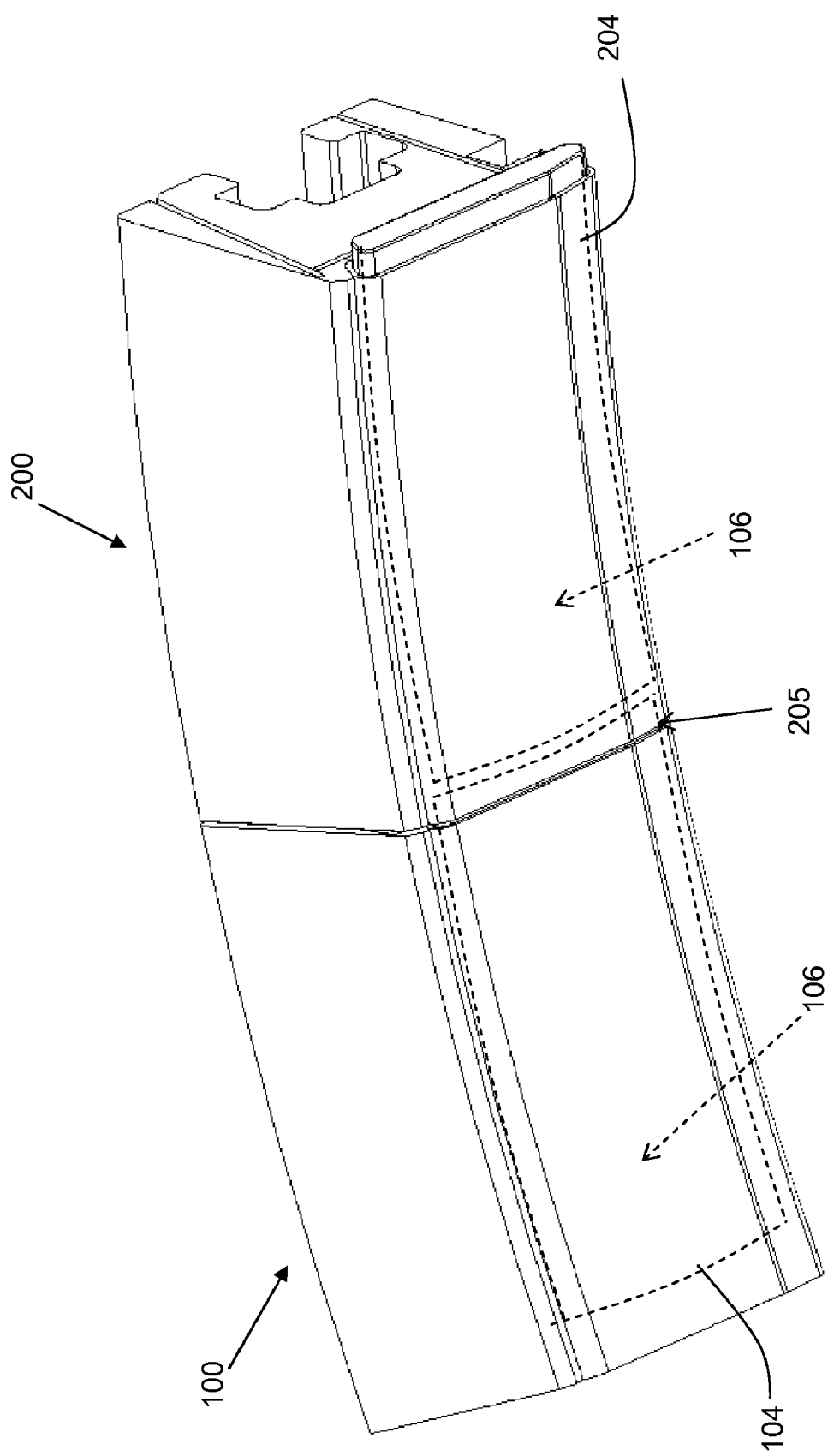
FIG. 5 is an isometric view of a turbine shroud assembly and a neighboring turbine shroud assembly according to an embodiment of this invention.
Figure 6:
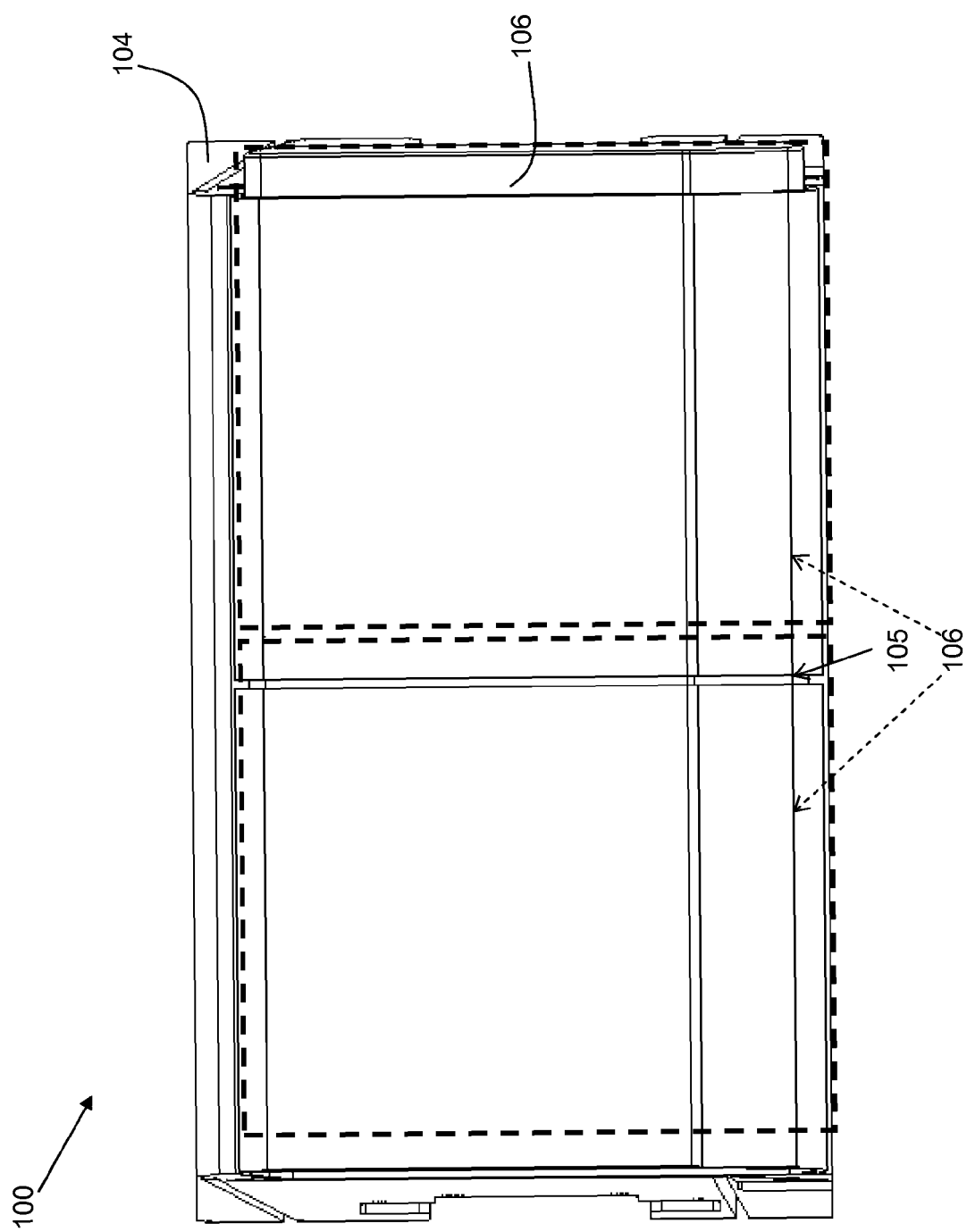
FIG. 6 is a bottom view of a turbine shroud assembly with discouragers therein shown in phantom according to an embodiment of this invention.

Discouragers 106 are positioned within inner shrouds 104 such that any gaps between inner shrouds 104 are covered. For example, as shown in FIG. 5, discourager 106 is offset such that it extends past inner shroud 104 and into an inner shroud 204 of an adjacent, neighboring shroud assembly 200. Therefore, discourager 106 is positioned to cover a gap 205 between inner shroud 104 and adjacent inner shroud 204. While this extension of discourager 106 into neighboring inner shroud 204 is shown in FIG. 5 as an embodiment with a single inner shroud 104, it is understood that a similar arrangement would be possible for an embodiment including a plurality of inner shrouds 104. For example, if a plurality of inner shrouds 104 (and therefore a plurality of discouragers 106) are provided, a discourager 106 that was closest to an end of inner shroud 104 could extend into adjacent inner shroud 204. As shown in FIGS. 4 and 6, if a plurality of discouragers 106 are provided within a plurality of inner shrouds 104, discouragers 106 can be positioned offset from inner shrouds 104 so as to cover expansion space 105 between inner shrouds 104 (shown best by the phantom lines in FIGS. 4 and 6).

As such, discouragers 106 prevent the hot operative fluid from having a direct line of access to outer shroud 102 and provide a tortuous path from the operative fluid path to outer shroud 102. In this way, less hot operative fluid reaches outer shroud 102, enabling the use of conventional metallic seals and components in outer shroud 102. In addition, the arrangement of discouragers 106 according to embodiments of this invention effectively seals expansion spaces 105 in inner shrouds 104, and gaps 205 between inner shrouds of neighboring assemblies, without the addition of cooling, thus allowing discouragers 106 to have the same or similar capability of inner shrouds 104, eliminating the need for additional cooling for discouragers 106 as would be necessary if conventional metal seals or complex assemblies were used.

Discouragers 106 can comprise any suitable material, such as a ceramic material, a CMC material, a monolithic type ceramic, a turbine grade superalloy (such as a Ni superalloy), etc. In order to ease installation, discouragers 106 can have at least one beveled edge 108, 110 as shown best in FIG. 7. In addition, as shown best in FIG. 2, inner shrouds 104 can also include at least one beveled edge 107. Discouragers 106 need not be bonded to inner shrouds 104; however, in one embodiment, discouragers 106 can be mechanically attached to inner shrouds 104.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A shroud assembly for use in a turbine, the shroud assembly comprising:
    an outer shroud having a first side configured to interface with an outer casing of the turbine, and a second side proximate to a flow of an operative fluid of the turbine;
    a hollow inner shroud positioned between the second side of the outer shroud and the operative fluid flow of the turbine, wherein the hollow inner shroud has a channel therethrough; and
    a solid discourager shaped to substantially correspond to a circumferential and axial shape and size of the channel in the hollow inner shroud, wherein the discourager is within the hollow inner shroud and is positioned to extend at least partially into a hollow inner shroud of a neighboring shroud assembly.

2. The shroud assembly of claim 1, wherein the hollow inner shroud is comprised of a ceramic material, a ceramic matrix composite material, a monolithic type ceramic, or a Ni superalloy.

3. The shroud assembly of claim 1, wherein the solid discourager has at least one beveled edge.

4. The shroud assembly of claim 1, wherein the hollow inner shroud has at least one beveled edge.

5. The shroud assembly of claim 1, wherein the solid discourager is comprised of a ceramic material, a ceramic matrix composite material, a monolithic type ceramic, or a Ni superalloy.

6. A shroud assembly for use in a turbine, the shroud assembly comprising:
    an outer shroud having a first side configured to interface with an outer casing of the turbine, and a second side proximate to a flow of an operative fluid of the turbine;

at least two hollow inner shrouds adjacent to each other, positioned to create an expansion space therebetween, the at least two hollow inner shrouds positioned between the second side of the outer shroud and the operative fluid flow of the turbine, wherein each hollow inner shroud has a channel therethrough; and at least two solid discouragers adjacent to each other, each solid discourager shaped to substantially correspond to a circumferential and axial shape and size of the channel in a corresponding hollow inner shroud, wherein the at least two discouragers are within the hollow inner shrouds and are positioned offset from the at least two hollow inner shrouds so as to cover the expansion space.

7. The shroud assembly of claim 6, wherein at least one of: the at least two hollow inner shrouds and the at least two solid discouragers are comprised of a ceramic material, a ceramic matrix composite material, a monolithic type ceramic, or a Ni superalloy.

8. The shroud assembly of claim 6, wherein the at least two solid discouragers are positioned such that an end of at least one solid discourager extends past an end of the hollow inner shroud that the at least one solid discourager is within.

9. The shroud assembly of claim 8, wherein the end of the at least one solid discourager that extends past the hollow inner shroud extends into a hollow inner shroud of a neighboring shroud assembly.

10. The shroud assembly of claim 6, wherein the at least two solid discouragers each have at least one beveled edge, and wherein the at least two hollow inner shrouds each have at least one beveled edge.

11. The shroud assembly of claim 6, further comprising a gap between the at least two solid discouragers.

12. A turbine comprising:
an outer casing;
at least one rotating blade; and
a shroud assembly positioned between the outer casing of the turbine and the at least one rotating blade, the shroud assembly comprising:
an outer shroud having a first side configured to interface with the outer casing, and a second side configured to interface with the at least one rotating blade proximate to a flow of an operative fluid of the turbine;
at least one hollow inner shroud positioned between the second side of the outer shroud and the operative fluid flow of the turbine, wherein the at least one hollow inner shroud has a channel therethrough; and
at least one solid discourager shaped to substantially correspond to a circumferential and axial shape and size of the channel in the hollow inner shroud, wherein the discourager is within the at least one hollow inner shroud and is positioned offset from the at least one hollow inner shroud.

13. The turbine of claim 12, wherein the at least one hollow inner shroud is comprised of a ceramic material, a ceramic matrix composite material, a monolithic type ceramic, or a Ni superalloy.

14. The turbine of claim 12, wherein the at least one solid discourager is comprised of a ceramic material, a ceramic matrix composite material, a monolithic type ceramic, or a Ni superalloy.

15. The turbine of claim 12, wherein the at least one hollow inner shroud comprises two hollow inner shrouds adjacent to each other, positioned to create an expansion space therebetween and wherein the at least one solid discourager comprises two solid discouragers adjacent to each other positioned within the hollow inner shrouds, the solid discouragers positioned offset from the hollow inner shrouds so as to cover the expansion space.

16. The turbine of claim 15, further comprising a gap between the two solid discouragers.

17. The turbine of claim 12, wherein at least one solid discourager is positioned such that an end of the at least one solid discourager extends past an end of the at least one hollow inner shroud that the at least one solid discourager is within.

18. The turbine of claim 17, wherein the end of the at least one solid discourager that extends past the at least one hollow inner shroud extends into a hollow inner shroud of a neighboring shroud assembly.

* * * * *